UNITED STATES PATENT OFFICE.

FRANK P. BARNARD, OF WORCESTER, MASSACHUSETTS, ASSIGNOR TO WOODMAN-DAVIS COMPANY, OF WORCESTER, MASSACHUSETTS, A CORPORATION OF MASSACHUSETTS.

DENTIFRICE.

No. 840,738.　　　Specification of Letters Patent.　　　Patented Jan. 8, 1907.

Application filed May 11, 1906. Serial No. 316,328.

*To all whom it may concern:*

Be it known that I, FRANK P. BARNARD, a citizen of the United States, and a resident of Worcester, in the county of Worcester and State of Massachusetts, have invented certain new and useful Improvements in Dentifrices; and I do hereby declare the following to be a full, clear, and exact description of the invention, such as will enable others skilled in the art to which it appertains to make and use the same.

My invention relates to a composition powder dentifrice having antiseptic, germicidal, bleaching, and detergent qualities.

It is a well-known fact of chemistry that hydrogen dioxid possesses the property of decomposing dead organic matter by virtue of its oxidizing power, which depends upon the readiness of the hydrogen dioxid to part with one of its atoms of oxygen by which the hydrogen dioxid is converted into water and oxygen. Upon this same oxidizing power the well-known antiseptic and germicidal properties of hydrogen dioxid also depend. These qualities naturally possessed by hydrogen dioxid make it particularly valuable and useful as a cleansing and antiseptic material for use in the mouth, especially as it is non-poisonous and without any deleterious effect upon living tissue. So far as I am aware it is impossible to incorporate hydrogen dioxid into a powder composition without its losing its valuable properties above mentioned, and hence its use as a dentifrice has heretofore been confined to liquid form.

The object of my invention is to produce a dentifrice composition of powder form having as an ingredient a substance which in the presence of the acids in the mouth will be transformed into hydrogen dioxid and milk of magnesia.

My invention is based on the known fact that magnesium dioxid when brought into contact with acids, and sometimes even in contact with moisture, undergoes decomposition, with the formation of hydrogen dioxid and milk of magnesia by substitution of the base for the hydrogen of the acid.

The invention therefore consists in combining magnesium dioxid with any of the usual well-known or suitable tooth-powder materials which provide the requisite or desired antacid, detergent, and abrasive or cleansing properties. I have found by research and experiment that of the several dioxids that of magnesium is best adapted to the purpose of my invention. It is possible by incorporating this ingredient in the composition to confer upon a powder dentifrice the antiseptic, detergent, cleansing, and bleaching properties which hydrogen dioxid possesses in liquid form and at the same time obtain the further advantages which the physical and chemical properties of a powder dentifrice possess over a liquid dentifrice. These properties are the antacid property of the chalk used as the tooth-powder base and the mechanically-detersive property of the chalk base, which by friction of its ultimate particles helps to mechanically remove adherent deposits upon the surfaces of the teeth.

A peculiar value obtained by the addition of magnesium dioxid to a tooth-powder base is that whenever a local acid area exists, as in tooth decay or as the result of fermenting food particles between the teeth or around their necks, the locally-formed acid reacts with the magnesium dioxid and the acid is neutralized by the magnesium, hydrogen dioxid is liberated, and milk of magnesia is formed. The hydrogen dioxid then exerts its germicidal and oxidizing property at the exact location where such action is most needed as a therapeutic means, and the milk of magnesia renders alkaline the contents of the oral cavity. In short, the magnesium dioxid has a selective tendency for those locations where local acidity is exerting destructive action upon the tooth structure.

For practical purposes I have ascertained that about seven per cent. of magnesium dioxid is sufficient to accomplish the detergent, germicidal, and bleaching ends above described and when incorporated in a powder dentifrice intended for habitual daily use, although a similar or larger proportion may be used as occasion requires. A suitable dentifrice composition may consist, for example, of ninety per cent. precipitated chalk, three per cent. powdered castile-soap, and seven per cent. magnesium dioxid, together with flavoring and coloring matter, as preferred. These proportions may be altered and other ingredients added to or substituted for those mentioned, as desired.

It is obvious that my improved powder dentifrice may be compressed into tablet or lozenge form, if desired.

I claim as my invention—

1. A dentifrice composition consisting of magnesium dioxid and an abrading-powder, substantially, in the proportions and for the purpose herein specified.

2. A dentifrice composition consisting of magnesium dioxid and powdered chalk, substantially in the proportions and for the purpose herein specified.

3. A dentifrice composition consisting of magnesium dioxid, powdered chalk, and a saponaceous substance, substantially in the proportions and for the purpose herein specified.

FRANK P. BARNARD.

Witnesses:
E. N. BARKER,
O. A. TAFT